Oct. 17, 1944.  J. H. HIGBEE  2,360,325

METHOD AND MEANS FOR INSURING SABOTAGE DETECTION

Filed March 18, 1942

INVENTOR
JOHN H. HIGBEE
BY HARRIS, KIECH, FOSTER & HARRIS
*Clarence F. Kiech*
FOR THE FIRM
ATTORNEYS.

Patented Oct. 17, 1944

2,360,325

UNITED STATES PATENT OFFICE 2,360,325

METHOD AND MEANS FOR INSURING SABOTAGE DETECTION

John H. Higbee, North Hollywood, Calif., assignor to Durochrome Co., Inc., Los Angeles, Calif., a corporation of California Application March 18, 1942, Serial No. 435,135

4 Claims. (Cl. 292—307)

My invention relates to the general problem of preventing and detecting unauthorized tampering with various devices, with special reference to sabotage, and is directed to an improved method of prevention and detection involving the use of a sealing film which may be applied in the manner of a decalcomania transfer.

The general object of the invention is to provide an effective and thoroughly dependable anti-sabotage method of sealing the juncture of relatively movable members. One of the relatively movable members to be sealed may, for example, be a door or an inspection plate or simply the head of a screw or bolt, the other member being a surrounding or adjacent wall. It is my purpose to provide a method and sealing medium such that any significant relative movement between the two relatively movable members will be inevitably apparent in rupture of the sealing medium. It is further contemplated that any attempt to remove the sealing medium bodily or to lift a portion of the sealing medium from the surface of a member can result only in defacement of the sealing medium.

Certain objects of the invention relate to the physical character of the sealing film with emphasis on the degree of internal cohesion of the film relative to other factors important in the present problem. One of these objects is to achieve sufficient cohesion to make the film self-supporting over any gap that may exist between two relative movable members, as well as cohesion sufficient to enable the film to endure and to retain its original physical state under ordinary conditions of storage and transportation, and yet to make the film so fragile that any tampering becomes evident in clearly perceptible damage to the film. Another of these objects may be stated as the attainment of substantially greater adhesion than cohesion on the part of the sealing medium. In other words, I propose to employ a film in which the adherence of the film externally to the surface of the member to which the film is applied will so exceed the internal coherence of the film material that any force or instrument applied to separate the film from the surface will simply rupture the film. My invention is characterized then by the concept of employing a film that is tenaciously adhesive and maintains its physical structure sufficiently to serve as a sealing medium and yet is of delicate structure.

Another object of the invention is to provide for application to a paint-coated surface a seal that will respond only to solvents that will attack the paint coat. The effect on the paint of using such a solvent cannot be concealed.

Other objects of the invention relate to the prevention of counterfeiting. Since the sealing film produced in accord with the invention is tamper-proof, a saboteur may attempt to duplicate the sealing medium so that the original seal may be either replaced or covered with a spurious seal of similar appearance. One object in this regard is to provide a sealing medium that may incorporate a unique design and to provide a sealing medium that may be produced with new designs from time to time at no great additional expense. In the present practice of my invention another object in this regard is to provide a sealing film adapted to receive in a permanent manner a signature or other inspection character or indicia difficult to forge by saboteurs.

A further object of the invention is to provide an anti-sabotage seal that may be produced in quantities at relatively little cost and may be applied to surfaces in a simple and rapid manner.

A still further object is to provide an anti-sabotage seal that will withstand extremes of heat and moisture without deteriorating in effectiveness or in appearance.

The above and other objects of my invention will be apparent in my detailed description below, taken with the accompanying drawing.

In the drawing, which is to be considered as illustrative only:

The basic concept underlying the invention is the application of a relatively delicate film across the juncture of two relatively movable members, the film being of such character as to permanently and tenaciously adhere to the adjacent surfaces of the two members. This concept is distinctly different from the concept of merely applying a sticker or gum-coated label to the two adjacent surfaces across the line of juncture. Any expedient involving the use of a sheet of paper or other fibrous material coated with adhesive inevitably involves an array of disadvantages and defects, including the following: an ordinary sheet of paper has sufficient cohesion to withstand substantial stress and therefore favors bodily removal by careful manipulation; it is exceedingly difficult to achieve such an intimate bond between a fibrous sheet and an adhesive coating as to preclude lifting the sheet away from the adhesive; any sheet of ordinary material will not stand weathering without tending to curl or split; unless a sheet of ordinary material is given a waterproof treatment, it will afford inadequate protection to the underlying adhesive in wet weather; adhesives commonly used for stickers and labels as well as other adhesives that would ordinarily be considered by a person skilled in the manufacture of gum stickers will crack, curl, deteriorate or soften, lose tackiness under adverse weather conditions or merely with the passage of time, and therefore are not suitable for an anti-sabotage seal.

Under my broad concept the film may be formed and applied to the adjoining relatively movable surfaces in any suitable manner. For example, a suitable liquid may be sprayed onto or brushed over the two adjoining surfaces providing the liquid is of such character as to dry into the form of a film interconnecting the two surfaces and tenaciously adhering to the two surfaces. I prefer, however, to preform a film of the requisite character and then apply the finished film whenever need arises for an anti-sabotage seal. In this preferred practice of the invention the preformed films may be freely handled and transported until needed and then may be applied in the simple and convenient manner of decalcomania transfers, there being no necessity for the operator to handle the film material in liquid form.

The preformed anti-sabotage seals may be constructed in the same manner as various types of decalcomania transfers, but I prefer to pattern the new seal on the slide-off type of transfer. For the purpose of the present disclosure I shall describe a specific practice of the invention in which the anti-sabotage seal is of the slide-off type, knowing that such a disclosure will be adequate guidance for those skilled in the art who may choose to follow other decalcomania practices under my general concept.

Figure 1:
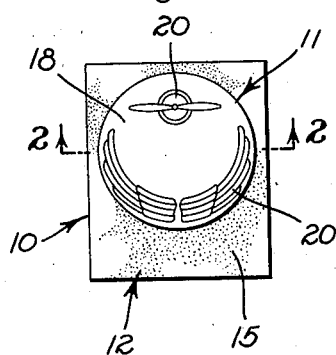
Fig. 1 is a plan view of an anti-sabotage seal exemplifying my invention, the seal being in the form in which it is delivered to a military inspector for use in the performance of his duties.
Figure 2:
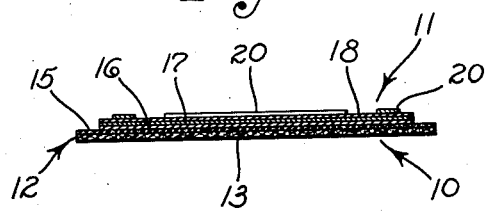
Fig. 2 is an exaggerated cross section of the seal taken as indicated by the line 2—2 of Fig. 1.

Fig. 1 shows what may be termed a transfer generally designated 10 comprising a preformed sealing film generally designated 11 on a rectangular backing sheet generally designated 12, there being no significance in the particular configurations. Fig. 2 shows an exaggerated or diagrammatic cross section of the transfer 10.

The backing sheet 12 may be a sheet of absorbent paper 13 carrying a suitable water-soluble separation coat 15. Such a separation coat, in accord with well known practices in the decalcomania art, may be a coating of starch, gelatin, gum tragacanth or the like or may constitute successive layers of such materials.

The preformed sealing film 11 comprises a unitary series of layers of various materials, and the materials used as well as the number of such layers may vary in various practices of the invention, bearing in mind that the composite must be low in cohesion or tensile strength. The lowermost layer 16 is by preference what may be termed a water-insoluble adhesive that is permanently tacky and of such character as to permanently adhere with extreme tenacity to any surface. Such an adhesive coat may be any suitable water-insoluble material that has the requisite adhesiveness and requisite permanency with respect to the adhesive state. I may use a water-insoluble resinous material such as a resin having a chemical combination of phthalic and other polybasic acids, glycerine, and other polyhydric alcohols and modifying agents, such as saturated fatty acids, or I may use a plasticized resin. The selected resinous material should be of the non-oxidizing type to maintain its original tacky state and should have non-drying constituents to prevent cracking with the passage of time.

In practice I have found that a composition suitable for the adhesive layer 16 may constitute the following ingredients in approximate proportions by weight:

| | Per cent |
|---|---|
| "Rezyl," a tacky material of resinous character sold under that trade-mark | 65 |
| Distillate, kerosene, or the like | 29 |
| "Butyl Cellusolve," a solvent sold under that trade-mark | 6 |

After the layer 16 is applied to the backing sheet 12, a layer of suitable material is applied to provide a non-tacky surface over the adhesive layer 16, and in some practices of the invention this additional layer may furnish the outer surface of the sealing film 11. In my preferred practice, however, I apply suitable material to the adhesive coat 16 to form a non-tacky surface thereover and then use that non-tacky surface as a base for one or more additional coatings or layers to complete the sealing film.

In manufacturing the particular transfer illustrated in Fig. 2, I apply a layer of shellac 17 to the upper surface of the adhesive coat 16, since shellac is a material that will dry thereon to form a non-tacky surface. On the hardened shellac I apply a further coat 18 which may aptly be termed the marking coat, since it is intended to provide a surface that may be readily marked with distinctive characters by pencil, ink, or other means. The marking coat may, for example, be any suitable flat paint comprising a mixture of linseed oil and pigment. Flat paint provides a non-glossy surface suitable for marking in ink. Finally, I may apply a design coat 20 to selected areas of the marking coat 18. The design coat may be applied, for example, by conventional printing practices or by a screen process.

Figure 3:
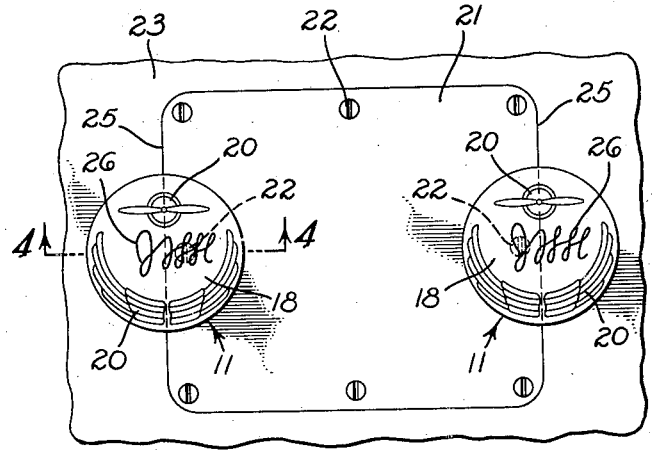
Fig. 3 is a plan view of two seals applied to the opposite margins of an inspection plate.
Figure 4:
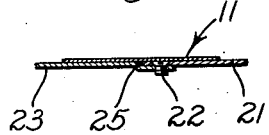
Fig. 4 is a cross section taken as indicated by the line 4—4 of Fig. 3.

To illustrate the manner in which the transfer 10 is employed, I show in Fig. 3 an inspection plate 21 that is normally retained by suitable screws 22 over an inspection aperture in the wall or skin 23 of an airplane wing. When the inspector approves of the structure accessible through the inspection aperture, he mounts the plate 21 over the aperture by the screws 22 and then applies two of the preformed sealing films 11 as indicated in Fig. 3. The procedure of applying a preformed sealing film to a surface involves simply soaking a transfer 10 in water to soften the separation coat 15 and then sliding the preformed film 11 off the backing sheet 12 onto the surface. It will be noted that the film or anti-sabotage seal 11 is caused to adhere both to the marginal surface of the inspection plate 21 and to the surrounding surface of the wall 23, the film lying across the line of juncture 25 between the inspection plate and the wall. There is usually something of a gap at the line of juncture, and the gap may be of substantial width, but a film of the described construction has sufficient strength to bridge such a gap in a self-supporting manner. After the two seals are in place, the inspector may scribble a distinctive character 26 in ink on an exposed area of the marking coat 18, the distinctive character being, for example, the initials of the inspector.

Since the two sealing films 11 in Fig. 3 are on opposite margins of the inspection plate 21, it is impossible to remove the inspection plate for access through the inspection aperture without either rupturing one of the sealing films 11 or separating one of the sealing films from the underlying surface of the airplane. Since a sealing film has greater adhesion on the underlying airplane surface than internal cohesion, it may not be lifted away from the airplane surface, and any attempt to effect bodily separation inevitably results in marring the delicate structure of the film. If a saboteur has in mind replacing one of the sealing films 11 with a spurious sealing film, he faces, first, the problem of duplicating the design coat 20 and, second, the problem of forging the distinctive character 26. The counterfeiter's problem may be made more difficult by frequently changing the design coat. Certain solvents such as acetone, butyl acetate, and "Butyl Cellusolve" will soften or otherwise affect the adhesive coat 16, but the same solvents will also affect any painted surface to which the sealing film may be applied.

Figure 5:
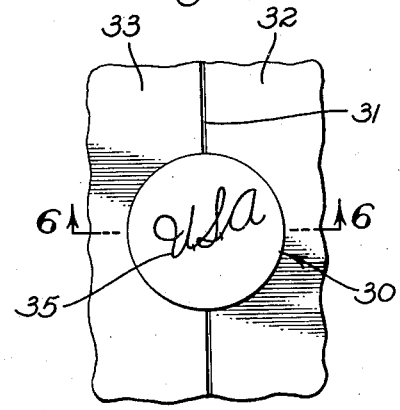
Fig. 5 is a plan view of a plain seal applied to the margin of a door or other closure.
Figure 6:
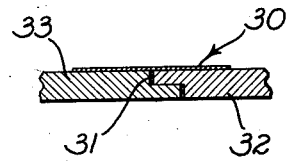
Fig. 6 is a cross section taken as indicated by the line 6—6 of Fig. 5.

Fig. 5 shows a sealing film 30 applied across the line of juncture 31 formed by a hinged door 32 and a wall 33, the door, for example, being a door of an airplane fuselage. Fig. 5 illustrates the practice of the invention in which the ornamental coat 20 is omitted, the sealing film 30 being in all other respects similar to the previously described film 11. After the sealing film 30 is applied, the inspector may or may not write a distinctive character 35 across the plain marking surface of the sealing film. At frequent intervals the color of the pigments employed in the marking coat 18 may be changed to discourage counterfeiting.

From the foregoing, it will be readily appreciated that the character of the adhesive coat 16 is of utmost importance in the practice of the invention. Since the adhesive coat 16 is permanently and tenaciously tacky, it will persistently adhere to any surface to which it is applied. Since its internal cohesion is not sufficient to withstand stresses that would be required to overcome its adherence, it will readily separate into discrete parts if any persistent attempt is made to remove it bodily from a surface. The permanent and tenacious tackiness of the adhesive coat works to advantage in both directions, i. e., the adhesive coat not only adheres to a surface to prevent removal of the sealing film, but also adheres just as tenaciously to whatever coat is superimposed thereon to complete the sealing film. Whatever coating material is applied to the upper surface of the adhesive coat 16 becomes inseparably united with the adhesive coat.

It is apparent that the simplest form of the sealing film consists of only the adhesive coat and a finishing coat superimposed thereon and that the finishing coat need not in all practices of the invention be especially adapted for marking. If marking is contemplated, the marking need not be made in ink or pencil. The marking may be accomplished, for example, by the simple application of pressure or by a lightly heated branding device.

My specific description herein of preferred practices of my invention will suggest to those skilled in the art various changes and substitutions under my inventive concept, and I reserve the right to all such departures from my disclosure that properly lie within the scope of my appended claims.

I claim as my invention:

1. A seal for preventing undetected tampering involving the relative movement of a first member and an adjacent second member, there being a line of juncture between such members, said seal comprising: a layer of water-insoluble adhesive material adhering to adjacent surfaces of such members adjacent such line of juncture; and a layer of paint superimposed upon said layer of adhesive material and bonded inseparably thereto and forming therewith a unitary film, said adhesive layer being formed of material offering greater resistance to separation from said layer of paint and from such surfaces than the resistance to rupture offered by said film.

2. A seal for preventing undetected tampering involving the relative movement of a first member and an adjacent second member separated from such first member by a line of juncture, such seal comprising: a layer of water-insoluble adhesive material adhering to the surfaces of such members adjacent such line of juncture; a layer of shellac superimposed upon said layer of adhesive material; and a layer of paint superimposed upon said layer of shellac, all of said layers being bonded inseparably together to form a unitary film having a resistance to removal from such surfaces greater than its resistance to rupture at such line of juncture.

3. A seal for preventing undetected tampering involving relative movement of a first member and an adjacent second member separated from such first member by a line of juncture therebetween, such seal comprising: a layer of water-insoluble tenaciously adhesive material adhering to surfaces of such members adjacent such line of juncture; a layer of paint superimposed thereon and bonded inseparably thereto; and a thin design layer of water-insoluble material superimposed upon said layer of paint, all of said layers being bonded inseparably together to form a unitary film having a resistance to removal from such surfaces greater than its resistance to rupture at such line of juncture.

4. A seal for preventing undetected tampering involving relative movement of a first member and an adjacent second member separated from such first member by a line of juncture, such seal comprising: a layer of water-insoluble tenaciously adhesive material adhering to the surfaces of such members adjacent such line of juncture; and a thin layer of paint superimposed thereon and bonded inseparably thereto and providing a non-glossy outer surface, said layers forming a unitary film having a resistance to removal from such surfaces greater than its resistance to tension at such line of juncture.

JOHN H. HIGBEE.